United States Patent
Ianev et al.

(10) Patent No.: US 10,631,356 B2
(45) Date of Patent: Apr. 21, 2020

(54) COMMUNICATION APPARATUS, CORE NETWORK NODE, SYSTEM, COMPUTER PROGRAM AND METHODS FOR REROUTING NAS-MESSAGES

(71) Applicant: NEC Corporation, Tokyo (JP)

(72) Inventors: Iskren Ianev, Heidelberg (DE); Toshiyuki Tamura, Tokyo (JP); Genadi Velev, Heidelberg (DE); Andreas Kunz, Heidelberg (DE); Andreas Maeder, Heidelberg (DE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/543,480

(22) PCT Filed: Dec. 21, 2015

(86) PCT No.: PCT/EP2015/080827
§ 371 (c)(1),
(2) Date: Jul. 13, 2017

(87) PCT Pub. No.: WO2016/113083
PCT Pub. Date: Jul. 21, 2016

(65) Prior Publication Data
US 2017/0374613 A1 Dec. 28, 2017

(30) Foreign Application Priority Data

Jan. 13, 2015 (EP) ..................... 15150900

(51) Int. Cl.
*H04W 48/20* (2009.01)
*H04W 36/22* (2009.01)
(Continued)

(52) U.S. Cl.
CPC ........... *H04W 76/18* (2018.02); *H04W 8/065* (2013.01); *H04W 36/22* (2013.01); *H04W 40/04* (2013.01);
(Continued)

(58) Field of Classification Search
CPC ... H04W 48/20; H04W 76/027; H04W 36/22; H04W 40/04; H04W 76/18; H04W 76/12; H04W 8/065; H04W 92/045
(Continued)

(56) References Cited

U.S. PATENT DOCUMENTS

2004/0162077 A1* 8/2004 Kauranen ............. H04W 48/18
455/445
2010/0080186 A1* 4/2010 Guo ...................... H04W 28/08
370/329
(Continued)

FOREIGN PATENT DOCUMENTS

CN    101272614 A    9/2008
CN    103428890 A    12/2013
(Continued)

OTHER PUBLICATIONS

Official Action issued by the Russian Patent Office in counterpart Russian Patent Application No. 2016149150, dated Dec. 11, 2017.
(Continued)

*Primary Examiner* — Faisal Choudhury
(74) *Attorney, Agent, or Firm* — Finnegan, Henderson, Farabow, Garrett & Dunner, L.L.P.

(57) ABSTRACT

A system is described in which a default MME (9A) receives a NAS message (S501, S505) from a mobile device (3D); sends a rerouting request (S509) to a base station (5) serving the mobile device (3D) and includes information identifying a group of dedicated MMEs (9D) to which the NAS message should be rerouted. If none of the dedicated MMEs (9D) is
(Continued)

available, then the default MME (9A) receives a message from the base station (5), the message rerouting the NAS message to the default MME (9A), instead of a dedicated MME (9D). The default MME (9A) either proceeds (S515*a*) to serving the mobile device (3D) or the default MME (9A) rejects (S515*b*) the NAS message.

14 Claims, 7 Drawing Sheets

(51) Int. Cl.
| | | |
|---|---|---|
| *H04W 76/18* | (2018.01) | |
| *H04W 8/06* | (2009.01) | |
| *H04W 40/04* | (2009.01) | |
| *H04W 76/12* | (2018.01) | |
| *H04W 92/04* | (2009.01) | |

(52) U.S. Cl.
CPC ............ *H04W 48/20* (2013.01); *H04W 76/12* (2018.02); *H04W 92/045* (2013.01)

(58) Field of Classification Search
USPC .......................................................... 370/230
See application file for complete search history.

(56) References Cited

U.S. PATENT DOCUMENTS

| | | | |
|---|---|---|---|
| 2010/0120399 A1* | 5/2010 | Guo ................. | H04L 29/12207 455/411 |
| 2013/0044709 A1 | 2/2013 | Adjakple et al. | |
| 2014/0355417 A1 | 12/2014 | Kim et al. | |
| 2017/0078867 A1* | 3/2017 | Ianev ..................... | H04W 8/065 |
| 2018/0077744 A1* | 3/2018 | Ianev .................... | H04W 76/12 |
| 2018/0279174 A1* | 9/2018 | Yannick ................ | H04W 8/065 |

FOREIGN PATENT DOCUMENTS

| | | |
|---|---|---|
| CN | 104081826 A | 10/2014 |
| RU | 2 461 137 C2 | 3/2012 |
| WO | WO 2012/108717 | 8/2012 |
| WO | WO 2013/109083 A1 | 7/2013 |
| WO | WO 2014/003436 A1 | 1/2014 |
| WO | WO 2014/201692 A1 | 12/2014 |
| WO | WO 2015/002290 A1 | 1/2015 |

OTHER PUBLICATIONS

Search Report issued by the Federal Service on Intellectual Property in counterpart Russian Patent Application No. 2016149150, dated Dec. 11, 2017.
International Search Report dated Apr. 18, 2016, in corresponding PCT International Application (PCT/EP2015/080827).
"3$^{rd}$ Generation Partnership Project: Technical Specification Group Services and System Aspects; Architecture Enhancements for Dedicated Core Networks; Stage 2, (Release 13)", 3GPP TR 23.707, V13.0.0, pp. 1-39, (2014).
"3$^{rd}$ Generation Partnership Project; Technical Specification Group Core Network and Terminals; General Packet Radio Service (GPRS); GPRS Tunnelling Procotocal (GTP) across the Gn and Gp interface, (Release 12)", 3GPP TS 29.060, V12.7.0, pp. 1-183, (2014).
"3$^{rd}$ Generation Partnership Project; Technical Specification Group Radio Access Network; Evolved Universal Terrestrial Radio Access Network, (E-UTRAN); S1 Application Protocol (S1AP). (Release 12)", 3GPP TS 36.413, V12.4.0, pp. 1-300, (2014).
"3$^{rd}$ Generation Partnership Project; Technical Specification Group Services and System Aspects; General Packet Radio Service (GPRS) Enhancements for Evolved Universal Terrrestrial Radio Access Network, (E-UTRAN) Access. (Release 12)", 3GPP TS 23.401, V12.7.0, pp. 1-308, (2014).
"3$^{rd}$ Generation Partnership Project; Technical Specification Group Core Network and Terminals; Non-Access-Stratum (NAS) protocol for Evolved Packet System (EPS); Stage 3, (Release 12)", 3GPP TS 24.301, V12.7.0, pp. 1-372, (2014).
"3$^{rd}$ Generation Partnership Project; Technical Specification Group Services and System Aspects; Enhancements of Dedicated Core Networks Selection Mechanism; (Release 14)", 3GPP TR 23.711, V.0.2.0, pp. 1-20, (2015).
Notice of Reasons for Refusal issued by the Japanese Patent Office in counterpart Japanese Patent Application No. 2017-535802, dated Jul. 16, 2019.
First Office Action issued by the Chines Patent Office in counterpart Chinese Patent Application No. 201580073334.4, dated Oct. 9, 2019.

* cited by examiner

COMMUNICATION APPARATUS, CORE NETWORK NODE, SYSTEM, COMPUTER PROGRAM AND METHODS FOR REROUTING NAS-MESSAGES

CROSS-REFERENCE TO RELATED PATENT APPLICATIONS

This application is a National Stage Entry of International Application No. PCT/EP2015/080827, filed Dec. 21, 2015, which claims priority from European Patent Application No. 15150900.7, filed Jan. 13, 2015; the entire contents of the above-referenced applications are expressly incorporated herein by reference.

The present invention relates to a communication system. The invention has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including LTE-Advanced. The invention has particular although not exclusive relevance to using a dedicated core network.

Under the 3GPP standards, a 'NodeB' (or an 'eNB' in LTE) is the base station via which mobile devices connect to a core network and communicate to other mobile devices or remote servers. In order to be able to do so, the mobile devices establish a so called radio resource control (RRC) connection with a serving base station. For simplicity, the present application will use the term base station to refer to any such base stations. Communication devices might be, for example, mobile communication devices such as mobile telephones, smartphones, user equipment, personal digital assistants, machine type communication (MTC) devices, Internet of Things (IoT) devices, laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile communication devices (or mobile devices) in the description but it will be appreciated that the technology described can be implemented on any mobile and "non-mobile" equipment that can connect to such a core network.

Under the 3GPP standards, base stations are coupled to a core network (referred to as an enhanced packet core (EPC) network in LTE). In order to keep track of the mobile devices and to facilitate movement between the different base stations, the core network comprises a number of mobility management entities (MMEs) which are in communication with the base stations coupled to the core network. Communication between the mobile devices and their associated MME is carried out using non-access stratum (NAS) signaling (via the serving base station). In some core networks, a serving GPRS support node (SGSN) may also be used instead of an MME, depending on the radio access technology (RAT) used by the mobile device.

Recent 3GPP standards (for example, LTE, and more recently LTE-Advanced, or 'LTE-A' standards) make it possible for User Equipment (UE), such as mobile devices to connect efficiently to the core network using dedicated core network nodes (such as dedicated MMEs/SGSNs). Details of this so-called 'Dedicated Core Network' (DE-COR) feature have been discussed in 3GPP technical report (TR) 23.707 (V13.0.0), the contents of which are incorporated herein by reference.

In summary, the DECOR feature enables a network operator to deploy multiple dedicated core networks (DCNs) within its network (along with a common (i.e. non-dedicated) core network). The objective of the DECOR feature is to enable the deployment of DCNs which are dedicated to subscribers (UEs) sharing the same or similar characteristics.

Accordingly, each DCN may be dedicated to serve specific type(s) of subscribers and/or specific type(s) of services. DCNs are optional and can be deployed, selectively, for various types of radio access technologies (RATs), such as GERAN (GSM EDGE Radio Access Network), UTRAN, and/or E-UTRAN. For example, a network operator may deploy dedicated MMEs (in order to support E-UTRAN) but no dedicated SGSNs (thus without supporting GERAN/UTRAN), or vice versa. The motivations for deploying DECOR might include, amongst others, the provision of DCNs with specific characteristics/functions or scaling, to isolate specific UEs or subscribers (e.g. machine-to-machine (M2M) subscribers, subscribers belonging to a specific enterprise or a separate administrative domain, subscribers belonging to a mobile virtual network operator (MVNO), etc.) from other UEs or subscribers, etc.

However, such different groups of customers and devices may have different requirements in terms of features, traffic characteristics, availability, congestion management, signaling and user plane data usage, and/or the like. DCNs comprising dedicated/specialised core network elements/resources can help operators meet the requirements of such groups of devices/customers. DCNs may also contribute to meeting network availability and/or redundancy requirements, and facilitates independent scaling or specific feature provisioning for specific user or traffic types and isolating various types of users and traffic from each other.

Each DCN comprises of one or more MME/SGSN and it may comprise one or more serving gateway (S-GW), packet data network (PDN) gateway (P-GW), and/or policy and charging rules function (PCRF), as appropriate. In the following description the term "dedicated core network"/"DCN" is used to cover one or more network functions comprising: (1) a control plane function such as an MME or an SGSN; (2) a user plane network function such as an S-GW, a P-GW, a gateway GPRS support node (GGSN); and (3) a set of control plane and user plane functions.

Each subscriber can be allocated to and served by a specific DCN based on their respective subscription information and/or operator configuration. Networks deploying DCNs may have a default DCN (or default core network nodes of a common core network) for managing UEs for which a DCN is not available and/or if sufficient information is not available in order to assign a UE to a particular DCN. One or more DCNs may be deployed together with a default DCN (or default core network nodes) that all share the same RAN.

When in an area that supports DECOR (or when in an area where a DCN is deployed), each UE is initially allocated by its serving base station to an arbitrary/random or a default MME. The serving base station forwards the UE's NAS messages (at least the UE's initial NAS message) to the allocated MME. The allocated MME (which may also form part of a DCN) then determines whether that specific UE should be served by a different core network dedicated to that UE (i.e. a core network other than the one to which the allocated MME belongs).

When the currently allocated MME determines that a UE should be served by a different (dedicated) core network, it selects the appropriate DCN and requests the serving base station to reroute (redirect) the UE's NAS message to that DCN. The currently allocated MME also includes in its rerouting request information identifying the MME (or SGSN) that belongs to the selected DCN. The serving base station, based on the information identifying the selected MME/DCN, selects a new MME using a so-called NAS node selection function (NNSF), and sends the UE's NAS message to the selected MME.

However, the inventors have realised that the present procedures for MME/SGSN (re)selection and/or NAS message rerouting for DECOR functionality are inefficient and may result in unnecessary signaling and/or inefficient service continuity for some UEs. For example, in some cases, it may not be possible to complete the requested rerouting of a NAS message to the dedicated node or function (selected based on information provided by the currently allocated MME), because the DCN (or the dedicated core network node such as an MME or SGSN) may be unable to serve the rerouted/redirected UE. This may happen, for example: due to overload/high load (e.g. over a predetermined threshold) of the DCN and/or the dedicated core network node; a dedicated network resource being temporarily out of order or disconnected (and/or otherwise unavailable in at least a part of the network).

In such cases, therefore, the serving base station's attempt to reroute/redirect a particular NAS message to a dedicated core network may fail, which in turn may result in the network being unable to establish/maintain a service for the UE that has sent the NAS message.

Accordingly, preferred embodiments of the present invention aim to provide methods and apparatus which overcome or at least partially alleviate at least some of the above issues.

Although for efficiency of understanding for those of skill in the art, the invention will be described in detail in the context of a 3GPP system (UMTS, LTE), the principles of the invention can be applied to other systems in which mobile devices or User Equipment (UE) access the system using dedicated core network nodes.

In one aspect, the invention provides communication apparatus for a wireless communication system, the communication apparatus comprising: means for receiving, from a communication device, signaling for establishing a communication connection; means for sending signaling for setting up said communication connection to a first core network node; means for receiving, after said sending means sending said signaling for setting up said communication connection, from said first core network node, a message including information identifying a group of at least one core network node, to which said signaling for setting up said communication connection should be rerouted; means for determining whether at least one core network node of said group is available; and means for rerouting said signaling for setting up said communication connection to a default core network node (for example, said first core network node) that does not form part of said group when said at least one core network node of said group is not available.

In another aspect, the invention provides a core network node for a wireless communication system, the core network node comprising: means for receiving, from communication apparatus of said wireless communication system, signaling for setting up a communication connection for a communication device; means for sending, after said receiving means receiving said signaling for setting up said communication connection, to said communication apparatus, a message including information identifying a group of at least one core network node, to which said signaling for setting up said communication connection should be rerouted; and means for receiving, from said communication apparatus, a message rerouting said signaling, to said core network node, for setting up said communication connection to said core network node when none of said group of at least one core network node is available.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described, by way of example, with reference to the accompanying drawings in which.

OVERVIEW

Figure 1:
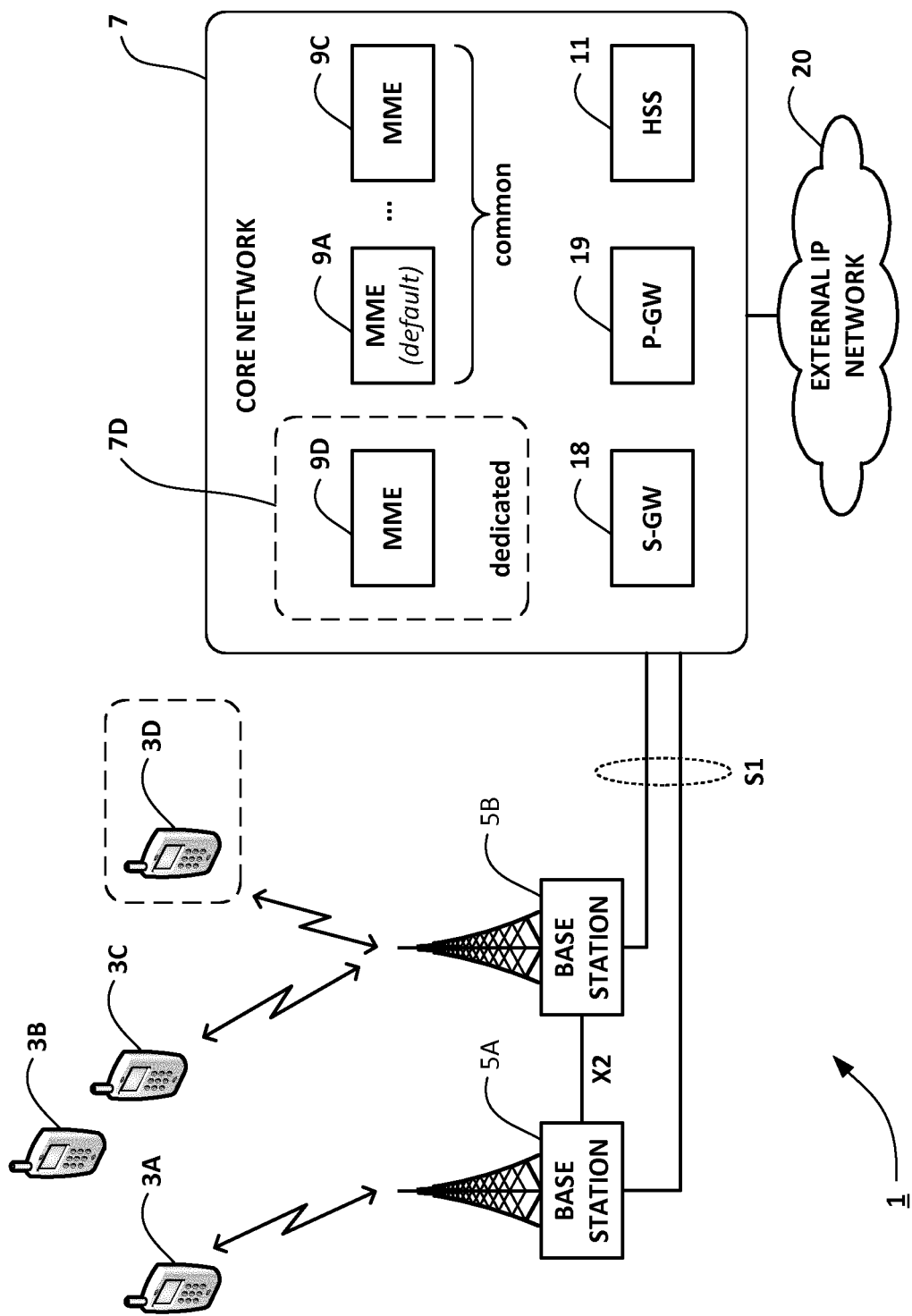
FIG. 1 illustrates schematically a cellular (tele)communication system to which embodiments of the invention may be applied.

FIG. 1 schematically illustrates a mobile (cellular or wireless) telecommunication network 1 in which users of mobile devices 3A to 3D can communicate with each other and other users via E-UTRAN base stations 5A, 5B and a core network 7 using an E-UTRA radio access technology (RAT). As those skilled in the art will appreciate, whilst four mobile devices 3 and two base stations 5 are shown in FIG. 1 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunication system 1. In order to keep track of the mobile device 3 and to facilitate movement between the different base stations 5, the core network 7 comprises a number of mobility management entities (MMEs) 9A to 9D, of which MMEs 9A to 9C are common MMEs (i.e. not associated with any specific mobile device 3 or associated with all mobile devices 3) and MME 9D is a dedicated MME (i.e. it is associated with one or more specific mobile device(s) 3). Therefore, as shown, MME 9D forms part of a dedicated core network (DCN) portion 7D whilst the other MMEs 9A to 9C form part of the main (or common) core network 7. Moreover, MME 9A is configured to act as a default MME for the mobile devices 3 (e.g. when first connecting to the core network 7 and/or when other MMEs are unavailable).

The MMEs 9 are in communication with the base stations 5 coupled to the core network 7. The core network 7 also comprises an HSS 11, and one or more gateways, such as a serving gateway (S-GW) 18 and/or a packet data network gateway (P-GW) 19.

The mobile devices 3 and their respective serving base stations 5 are connected via an LTE air interface, the so-called "Uu" interface. The base stations 5 are connected to each other via a so-called "X2" interface. Each base station 5 is also connected to the core network 7 nodes (i.e. the MME 9 and the S-GW 18) via a so-called "S1" interface. From the core network 7, connection to an external IP network 20, such as the Internet, is also provided via the P-GW 19. Although not shown in FIG. 1, the MME 9 is also connected to the HSS 11 and the gateway 18, 19 via respective 3GPP interfaces.

Some of the mobile devices 3 may be associated with a particular dedicated core network (comprising at least a dedicated MME and/or a dedicated gateway). For example, the HSS 11 may be configured to store relevant subscription data for each mobile device 3, such as settings and subscription data required for the 3GPP subscriber to access the network 1, associated service type(s) and preferences, information identifying corresponding subscriber group(s), etc, based on which subscription data it is possible to identify an association between a particular mobile device 3 and a corresponding core network 7 or 7D. For those mobile devices (e.g. the mobile device 3D in FIG. 1) that are associated with a particular dedicated core network (e.g. the DCN 7D), the HSS 11 (and/or the default MME 9A) may also be configured to store information which can be used in the selection of an appropriate dedicated core network (dedicated MME 9) for the subscriber.

In this system, the mobile device 3D is associated with the DCN 7D/MME 9D. In other words, the MME 9D is a core network node that forms part of the mobile device's 3D dedicated core network 7D (although the dedicated core network 7D may comprise a number of other core network nodes, if appropriate). Therefore, the core network 7 ensures that, whenever possible, the mobile device 3D is served by this dedicated core network 7D. In order to do so, the mobile device's 3 NAS messages are beneficially rerouted to a dedicated MME 9D (e.g. by the previous MME 9 and/or the serving base station 5) associated with the mobile device 3D, and that has had its status (e.g. its availability to serve the mobile device 3D) pre-checked. For example, when the base station 5B serving the mobile device 3D (initially) selects an MME 9 (such as the default MME 9A) that is not the correct MME for the mobile device 3D, then the serving base station 5B is able to obtain information based on which it is able to reroute the mobile device's 3D NAS message to the correct MME 9D.

Specifically, when the old (initial or default) MME 9 decides to reroute the mobile device's 3D NAS message to another (dedicated) core network, the old MME 9 generates and sends a request (such as a Reroute NAS Message Request) to the base station 5 which forwarded that NAS message. The MME 9 also includes in this request information for identifying the 'target' core network/MME to which the NAS message needs to be rerouted. For example, the information for identifying the core network/MME may comprise an MMEGI (for E-UTRAN) and/or a Null-NRI (for UTRAN and GPRS) corresponding to the MME/SGSN that belongs to the selected dedicated core network. It will be appreciated that the MME/SGSN may be configured with a mapping of MMEGI/Null-NRI to dedicated core network for the mobile device 3D and/or for a tracking area identifier (TAI) used by the mobile device 3D.

Beneficially, in one example, the base stations 5 are configured to obtain information about the availability/operational state of each connected MME 9 (or each of at least a subset of connected MMEs). The obtained information may comprise information identifying at least one of: a high load (e.g. over a predetermined threshold) for a particular MME 9; a relative load for a particular MME 9 (compared to another MME 9); an overload of a particular MME 9; a network failure; a particular MME 9 being out of order (at least temporarily); and dedicated resources/DCN not supported. For example, the base stations 5 may obtain this information during an initial setup procedure which configures the S1 connection between a particular base station 5 and MME 9 pair and/or anytime later when that MME 9 is reconfigured, using suitable S1 signaling (such as an 'S1 setup response' message, an 'MME configuration update' message, and/or the like).

Thus, based on the information about each connected MME's 9 availability (and based on the information for identifying the target core network/MME included in the old MME's 9 request), the serving base station 5 is able to determine whether or not it is possible to comply with the old MME's 9 NAS rerouting request (e.g. whether or not the target MME 9D is available/operational).

Specifically, if the serving base station 5 determines that the target MME 9D is available/operational, then the base station 5 sends (reroutes) the mobile device's 3D NAS message to the selected (dedicated) core network (in this example, to MME 9D).

However, if the serving base station 5 determines that the target MME 9D is not available/operational, then the serving base station 5 rejects the old MME's 9 rerouting request by generating and sending an appropriate response to the old MME's 9. Effectively, by rejecting the rerouting request the serving base station 5 can inform the old MME 9 that the dedicated core network (e.g. the MME 9D) cannot be used (at least for the mobile device 3D). Advantageously, the serving base station 5 also includes in its response to the old MME 9 information identifying a reason (or cause) for rejecting the old MME's 9 rerouting request. For example, the serving base station 5 may be configured to include information identifying a reject cause identifying at least one of: a high load (load over a predetermined threshold); an overload; a network failure; an MME/SGSN being out of order; and dedicated resources/DCN not supported.

Even when the old MME 9 (e.g. MME 9A or 9C) attempts to reroute a NAS message from the mobile device 3D to the corresponding dedicated MME 9D, the serving base station 5B can beneficially respond to the requesting MME 9A or 9C that the dedicated MME 9D is (still) unavailable (e.g. due to an overload). Thus, in the case of a failure to reroute the mobile device 3D to a dedicated network, the requesting MME 9A or 9C may be configured to: i) accept NAS messages from the mobile device 3D (e.g. the NAS message that could not be rerouted to the dedicated core network) and continue serving the mobile device 3D; or ii) reject the NAS message from the mobile device 3D (e.g. by generating and sending an appropriate error message to the mobile device 3D). When rejecting the NAS message from the mobile device 3D, the MME may return a Mobility Management back-off timer in the reject message so that the mobile device 3D does not come back until the back-off timer expires.

In summary, in this example, the base stations are beneficially able to reject the MME's rerouting request (e.g. when rerouting fails) and thereby notify the MMEs about a dedicated MME being overloaded (or otherwise being unavailable). For example, when the serving base station indicates to a default (currently selected) MME that the dedicated MME is overloaded, the default MME may attempt to serve the mobile device or reject the NAS message (e.g. by sending an appropriate response to the mobile device). Advantageously, when rejecting the NAS message from the mobile device 3D, the MME may return a Mobility Management back-off timer to the mobile device 3D in order to control when the mobile device 3D should attempt to re-send the NAS message.

In another example, (in addition to, or instead of the base stations 5) the MMEs 9 may also be configured to obtain information about the availability/operational state of each connected (other) MME 9. For example, neighbouring MMEs 9 may exchange appropriate signaling messages (for example, Echo Request/Echo Response messages in accordance with 3GPP TS 29.060 V12.7.0) in order to obtain information about the availability/operational state of other MMEs 9 (and in order to provide information about their own availability/operational state to other MMEs 9). The MME 9 that is allocated by default may also be configured to obtain information about the availability/operational state of other MMEs from the base station 5.

Thus, based on the information about each connected MME's 9 availability, the current MME 9 is able to determine whether or not it is possible to reroute the mobile device's 3D NAS message to another (dedicated) core network (in this example, to the MME 9D) (e.g. based on whether or not the MME 9D is available/operational).

Beneficially, if the current MME 9 determines that the (target) dedicated MME 9D (or DCN 7D) is not available/operational (i.e. rerouting of the mobile device 3D to a target dedicated MME fails), then the current MME 9 may be configured to: i) at least temporarily, accept NAS messages from the mobile device 3D (instead of rerouting it to the dedicated core network) and continue serving the mobile device 3D; or ii) reject the NAS message from the mobile device 3D (e.g. by generating and sending an appropriate error message to the mobile device 3D). When rejecting the NAS message from the mobile device 3D, the MME may return a Mobility Management back-off timer in the reject message so that the mobile device 3D does not come back until the back-off timer expires.

Therefore, if the currently serving MME 9 decides to continue serving the mobile device 3D (based on information about a dedicated MME's availability from either the serving base station 5 or the dedicated MME/DCN itself), then it is possible to ensure service continuity for the mobile device 3D even though the mobile device 3D is currently registered to an inappropriate (i.e. non-dedicated) MME 9.

Beneficially, when rerouting to an appropriate dedicated network (network node) fails (e.g. not possible for reasons such as a high load, overload, temporary failure, and/or the like), a NAS rerouting request can be rejected (e.g. as in the first example above) or avoided (e.g. as in the second example above) and the mobile device can be either served by the old (common) MME/SGSN or the mobile device can be rejected by the default MME (by returning an appropriate NAS response). When rejecting the NAS message from the mobile device 3D, the MME may return a Mobility Management back-off timer in the reject message so that the mobile device 3D does not come back until the back-off timer expires. Accordingly, in this system it is possible to avoid service failures for mobile devices arising from overloaded and/or unavailable dedicated network nodes.

Mobile Device

Figure 2:
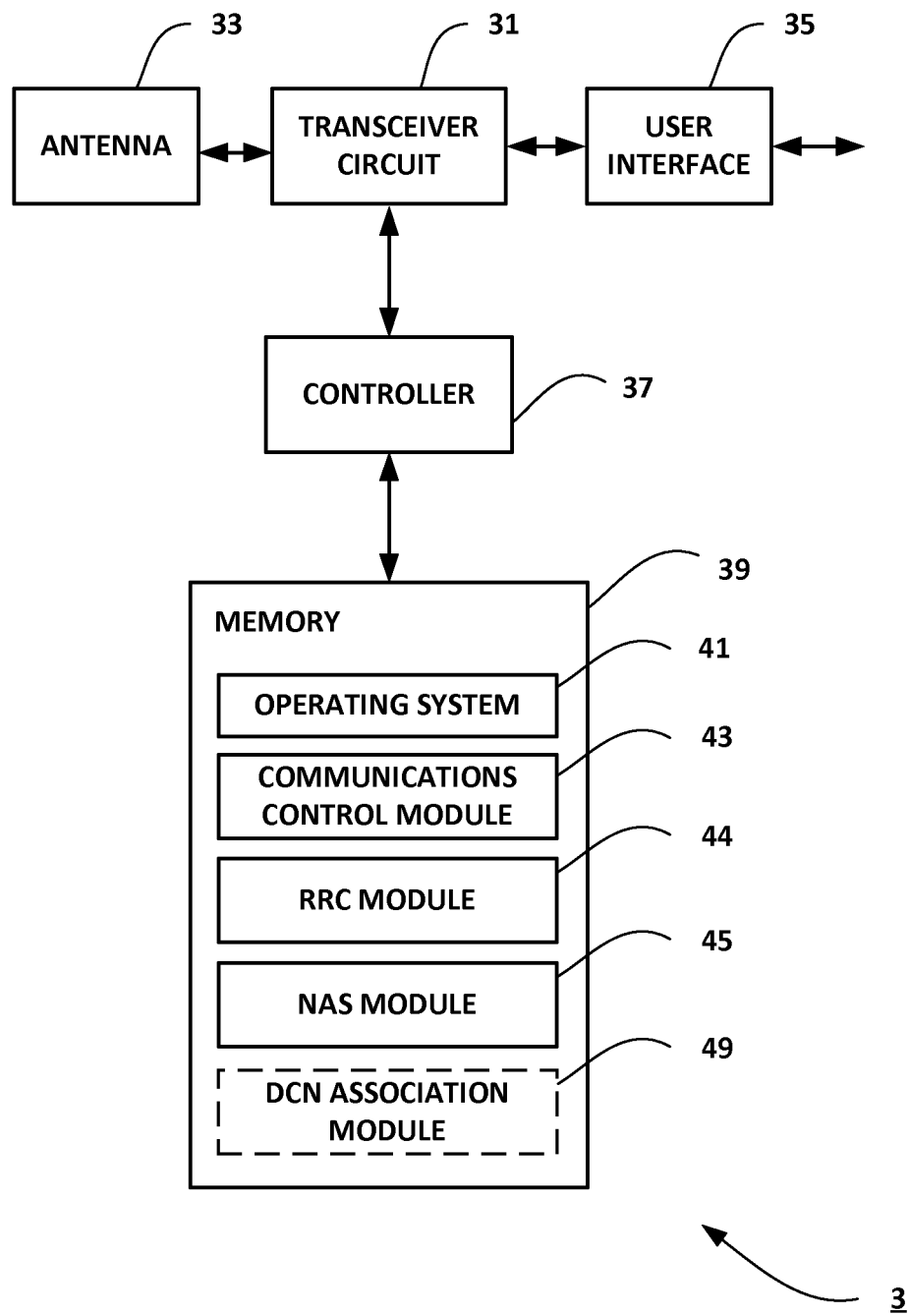
FIG. 2 is a block diagram of a mobile device forming part of the system shown in FIG. 1.

FIG. 2 is a block diagram illustrating the main components of one of the mobile devices 3 shown in FIG. 1. As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, an RRC module 44, a NAS module 45, and a dedicated core network association module 49 (optional).

The communications control module 43 controls the communication between the mobile device 3 and the base station 5. The communications control module 43 also controls the separate flows of control data and user data (for uplink and downlink) that are to be transmitted to the base station 5 and other nodes (via the base station 5) such as the MME 9 and/or the S-GW 18.

The RRC module 44 is operable to generate, send and receive signaling messages formatted according to the RRC standard. For example, such messages are exchanged between the mobile device 3 and its serving base station 5. The RRC messages may include, for example, messages relating to the random access procedure and/or the RRC messages comprising control data (e.g. NAS messages) to be relayed by the serving base station 5 to the MME 9.

The NAS module 45 is operable to generate, send and receive signaling messages formatted according to the NAS protocol. For example, such messages are exchanged (via the base stations 5) between the mobile device 3 and the MMEs 9. The NAS messages may include, for example, the NAS messages comprising control data relating to mobility of a mobile device 3, e.g. control data for registering the mobile device 3 with an MME 9.

When present, the dedicated core network association module 49 stores information about a dedicated core network associated with this mobile device 3. For example, the dedicated core network association module 49 may store information identifying the associated DCN in the form of a UE ID parameter, a UE type parameter, a DCN type parameter, a DCN ID parameter, an MME ID parameter (e.g. MMEGI), and/or the like.

Base Station

Figure 3:
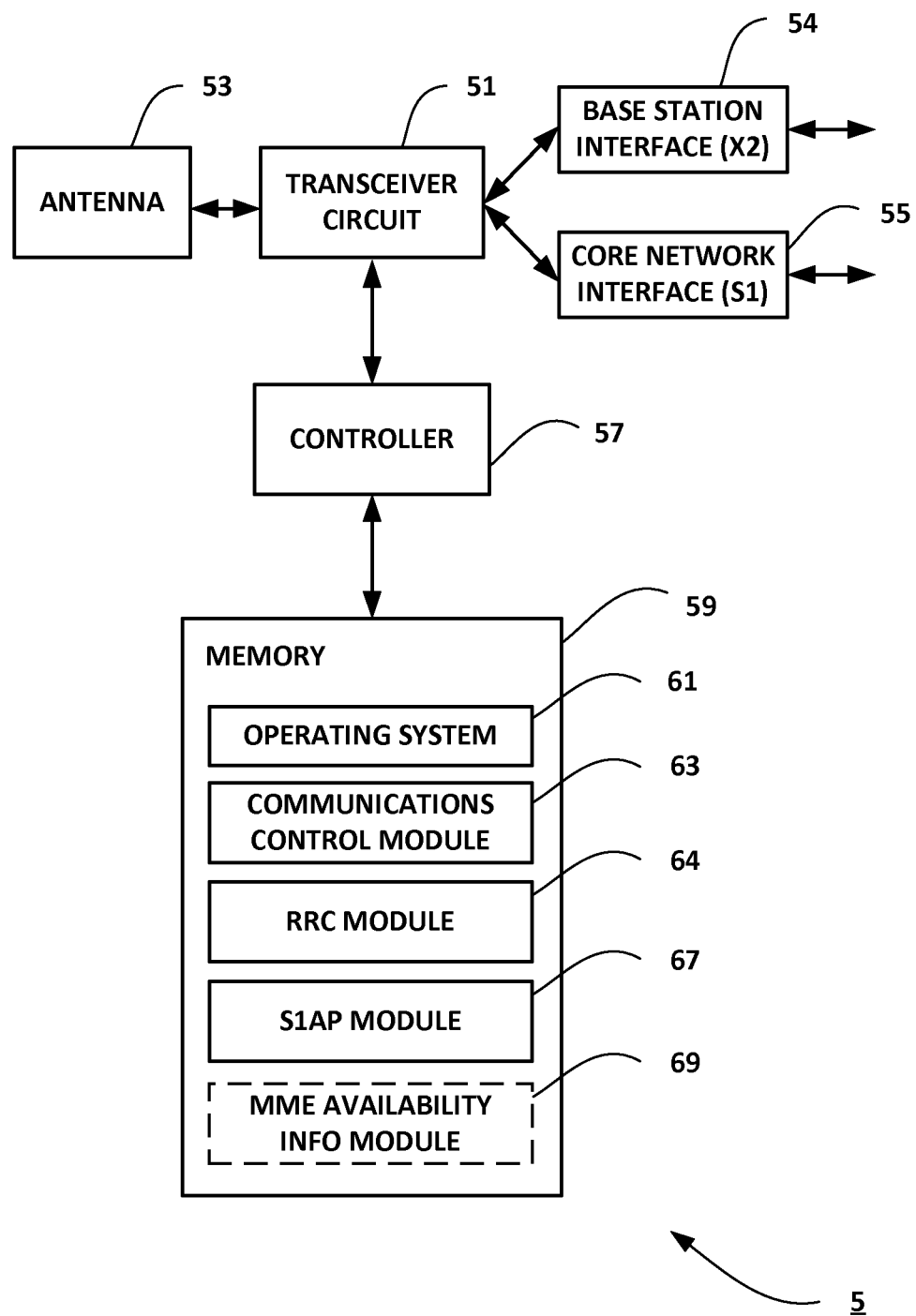
FIG. 3 is a block diagram of a base station forming part of the system shown in FIG. 1.

FIG. 3 is a block diagram illustrating the main components of one of the base stations 5 shown in FIG. 1. As shown, the base station 5 has a transceiver circuit 51 for transmitting signals to and for receiving signals from the mobile devices 3 via one or more antenna 53, a base station interface (X2) 54 for transmitting signals to and for receiving signals from other base stations, and a core network interface (S1) 55 for transmitting signals to and for receiving signals from the core network entities (e.g. the MMEs 9 and the S-GW 18). The base station 5 has a controller 57 to control the operation of the base station 5. The controller 57 is associated with a memory 59.

Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, an RRC module 64, an S1AP module 67, and an MME availability information module 69.

The communications control module 63 controls the communication between the base station 5 and the mobile devices 3 and other network entities (e.g. the MMEs 9) that are connected to the base station 5. The communications control module 63 also controls the separate flows of uplink/downlink user traffic and control data for the mobile devices 3 associated with this base station 5 including, for example, control data for rerouting NAS messages.

The RRC module 64 is operable to generate, send and receive signaling messages formatted according to the RRC standard. For example, such messages are exchanged between the base station 5 and the mobile devices 3 that are associated with this base station 5. The RRC messages may include, for example, the RRC messages comprising control data (e.g. NAS messages) for relaying between the mobile device 3 and its serving MME 9.

The S1AP module 67 is operable to generate, send and receive signaling messages formatted according to the S1 application protocol (S1AP) standard. For example, such messages are exchanged between the base station 5 and the MMEs 9 connected to this base station 5. The S1AP messages may include, for example, messages relating to rerouting of NAS signaling (such as Reroute NAS message requests, Reroute NAS message rejects), S1 setup messages, and associated responses.

The MME availability information module 69 stores information about availability of particular MMEs/SGSNs (or MME/SGSN groups), and may also store information whether such MMEs/SGSNs are associated with any DCN (and/or mobile device). The MME availability information module 69 provides this information to other modules, for example, the S1AP module 67 for use in rerouting NAS messages.

Mobility Management Entity

Figure 4:
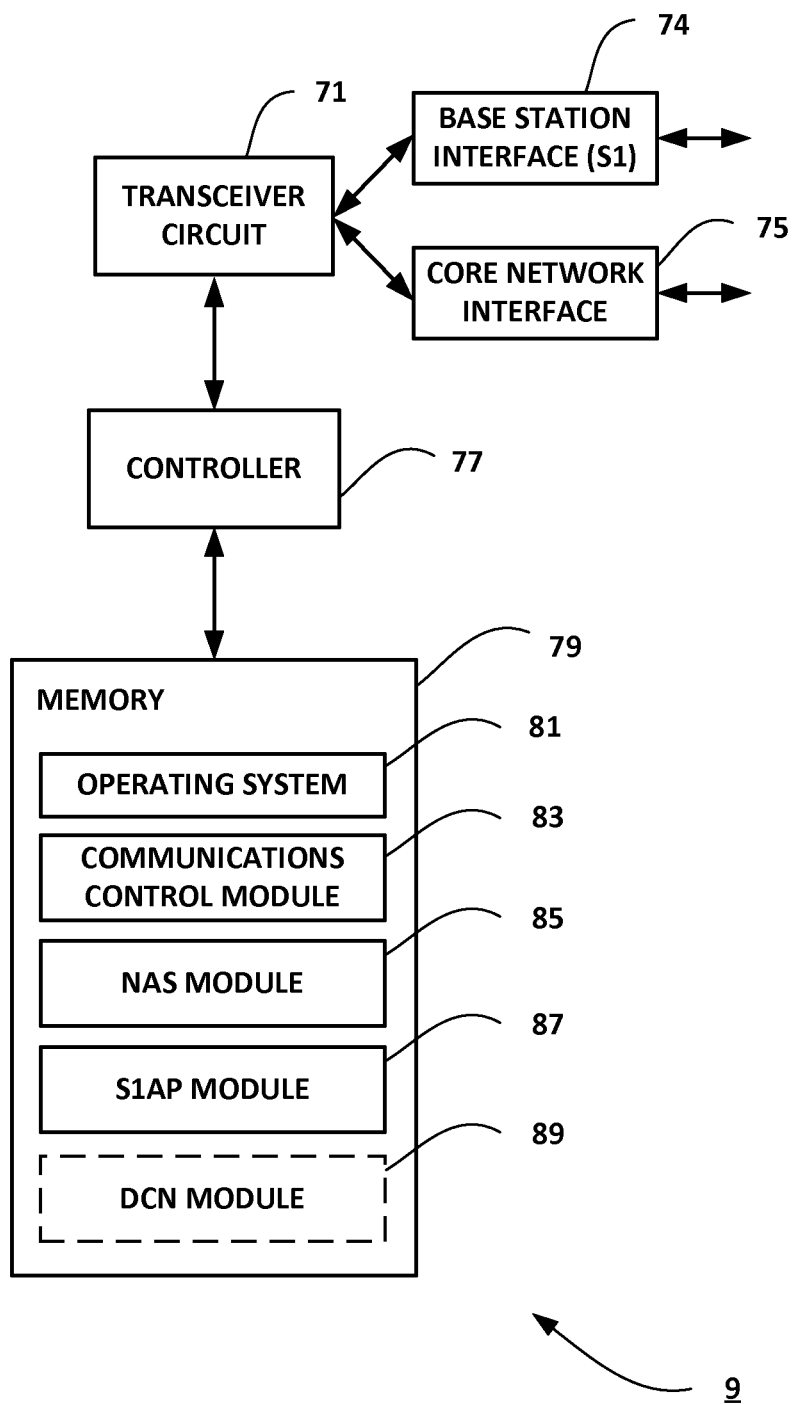
FIG. 4 is a block diagram of a mobility management entity forming part of the system shown in FIG. 1.

FIG. 4 is a block diagram illustrating the main components of one of the MMEs 9 shown in FIG. 1. As shown, the MME 9 has a transceiver circuit 71, a base station interface (S1) 74 for transmitting signals to and for receiving signals from the base stations 5, and a core network interface 75 for transmitting signals to and for receiving signals from other core network nodes (such as other MMEs 9). The MME 9 has a controller 77 to control the operation of the MME 9. The controller 77 is associated with a memory 79.

Software may be pre-installed in the memory 79 and/or may be downloaded via the communication network 1 or from a removable data storage device (RMD), for example. The controller 77 is configured to control the overall operation of the MME 9 by, in this example, program instructions or software instructions stored within memory 79. As shown, these software instructions include, among other things, an operating system 81, a communications control module 83, a non-access stratum module 85, an S1AP module 87, and a DCN module 89.

The communications control module 83 controls the communication between the MME 9 and other network entities that are connected to the MME 9 (e.g. the base stations 5, other MMEs 9, and any mobile devices 3 when connected to one of the base stations 5).

The NAS module 85 is operable to generate, send and receive signaling messages formatted according to the NAS protocol. For example, such messages are exchanged (via the base stations 5) between the MME 9 and the mobile devices 3 that are associated with this MME 9. The NAS messages may include, for example, the NAS messages comprising control data relating to mobility of a mobile device 3, e.g. control data for registering the mobile device 3 with the MME 9.

The S1AP module 87 is operable to generate, send and receive signaling messages formatted according to the S1 application protocol (S1AP) standard. For example, such messages are exchanged between the MME 9 and the base stations 5 connected to this MME 9. The S1AP messages may include, for example, messages relating to rerouting of NAS signaling (such as Reroute NAS message requests, Reroute NAS message rejects), S1 setup messages, and associated responses.

The DCN module 89 stores information whether the MME 9 is associated with a particular DCN and information identifying that DCN (for example, in the form of a MMEGI and/or CN type). The DCN module 89 also stores information whether neighbouring MMEs/SGSNs are associated with any DCN (and/or mobile device), and in some embodiments, it stores information about state/availability/load of particular MMEs/SGSNs (or MME/SGSN groups). The DCN module 89 provides this information to other modules, for example, the S1AP module 87 for use in rerouting NAS messages (e.g. selecting an appropriate target MME).

In the above description, the mobile device 3, the base station 5, and the MME 9 are described for ease of understanding as having a number of discrete modules (such as the communications control modules, the RRC/NAS modules, and the S1AP modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different embodiments will now be described that illustrate how different aspects of the invention can be put into effect using the above mobile device 3, base station 5, and MME 9. The embodiments will be described with reference to the signaling (or 'timing') diagrams shown in FIGS. 5 to 7.

Operation—First Embodiment (Base Station Controlled Rerouting)

Figure 5:
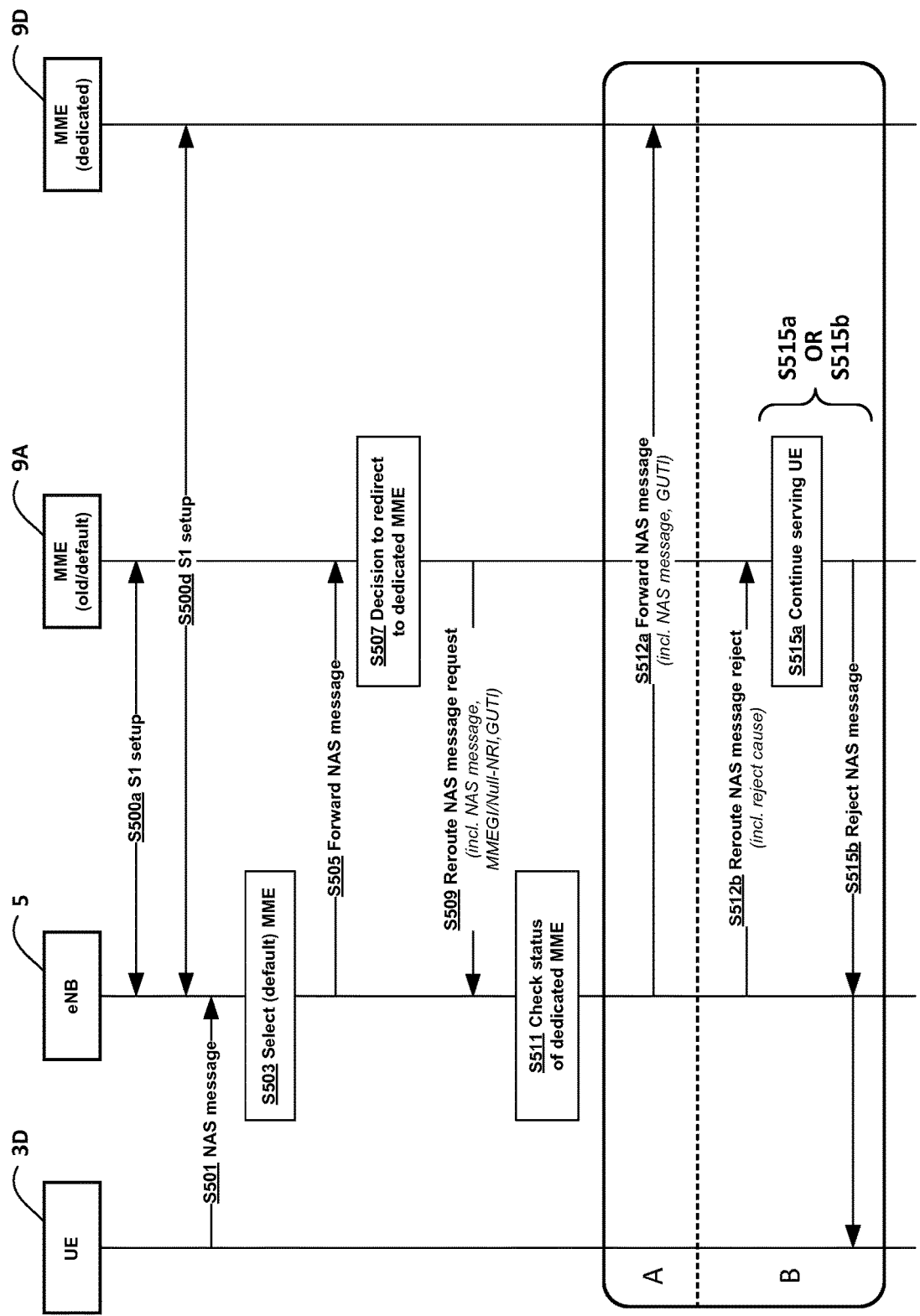
FIGS. 5 to 7 are timing diagrams indicating exemplary procedures for implementing some embodiments of the present invention.

FIG. 5 illustrates an exemplary timing diagram indicating a procedure for handling a request for rerouting a NAS message. Specifically, in this example, the base station 5 serving the mobile device 3D determines whether or not the rerouting is possible.

Initially, as generally illustrated in steps S500a and S500d, the base station 5 establishes (using its S1AP module 67) respective S1 connections with some (or all) MMEs 9 in the core network 7 (in this example, MME 9A and MME 9D).

The base station 5 is configured to add an entry for each connected MME 9 to the list of entries stored in its MME availability module 69 with an appropriate indication whether or not that MME is currently connected.

The procedure begins with the mobile device 3D generating (using its NAS module 45) and sending, in step S501, a NAS message to its serving base station 5 (for relaying the NAS message to an appropriate MME). The NAS message may comprise an attach request, a tracking area update (TAU), a routing area update (RAU), and/or the like. The mobile device 3D (using its RRC module 44) embeds this NAS message in a suitable RRC message and sends this RRC message to the serving base station 5 (after performing an appropriate random access procedure, if necessary).

Upon receipt of the mobile device's 3D NAS message, the serving base station 5 selects, in step S503, an MME 9 (in this example, the default MME 9A as the base station 5 does not have information about the mobile device DCN type/ subscription) for the mobile device 3D from among the MMEs 9 connected to the base station 5. In step S505, the base station 5 (using its RRC module 64) takes the NAS message from the received RRC message and forwards the NAS message to the selected (default) MME 9A (e.g. by embedding the NAS message in an appropriately formatted S1 message).

Next, as generally shown in step S507, the default MME 9A decides to move the handling of the mobile device's 3D NAS message to another MME (e.g. an MME that belongs to a DCN 7D that is associated with this mobile device 3D). The currently selected (default) MME 9A may decide to do so, for example, based on information identifying the mobile device, information identifying a location of the mobile device, and/or information identifying the a core network associated with the mobile device. It will be appreciated that such information may be included in the NAS message itself and/or may be obtained otherwise (e.g. from one of the MMEs 9, the HSS 11, or one of the base stations 5).

When the currently selected (default) MME 9A decides to reroute the NAS message to another MME, the MME 9A generates (e.g. using its S1AP module 87) and sends, in step S509, an appropriately formatted message requesting the serving base station 5 to reroute the NAS message (sent by the mobile device 3D) to another MME (in this case, the MME 9D forming part of the DCN 7D). In this example, the default MME 9A generates and sends a 'Reroute NAS Message Request' to the base station 5 that forwarded the NAS message.

As shown in FIG. 5, this Reroute NAS message request includes: the original (unmodified) NAS message from the mobile device 3D; information identifying a reroute parameter (e.g. an MME group identifier ('MMEGI') and/or a 'Null-NRI' to which the NAS message needs to be rerouted); a globally unique temporary identifier ('GUTI') associated with the mobile device 3D. It will be appreciated that the MME 9A may store (e.g. in its DCN module 89) information identifying a mapping of MMEGI/Null-NRI to dedicated core network/core network type (e.g. per tracking area), and select an appropriate MMEGI/Null-NRI based on this mapping. It will also be appreciated that the base station 5 is able to select a new MME (or a new SGSN) corresponding to the MMEGI/Null-NRI, for example, using NNSF functionality.

In this example, the mobile device 3D is supported by the dedicated MME 9D (that belongs to the group identified by its MMEGI in S509). However, as generally shown in step S511, before rerouting the NAS message, the base station 5 (using its MME availability info module 69) checks the status of the MME 9D that corresponds to the MMEGI/ Null-NRI parameter (provided by the default MME 9A in step S509).

Specifically, in this example, the base station 5 checks the status of the MME 9D using information identifying at least one of:
   a high load (e.g. over a predetermined threshold) for the selected MME 9D;
   a relative load for the selected MME 9D (compared to another MME 9, e.g. the default MME 9A);
   an overload of the selected MME 9D;
   a network failure;
   the selected MME 9D being out of order (at least temporarily);
   dedicated resources/DCN 7D not supported (e.g. via this base station 5 and/or in the mobile device's 3D current location); and
   none of the above.

It will be appreciated that the base station 5 may obtain such information during an initial setup procedure which configures a respective S1 connection between the base station 5 and the MME 9D and/or anytime later when the MME 9D is reconfigured, using suitable S1 signaling (such as an 'S1 setup response' message, an 'MME configuration update' message, an 'Overload Start' message, and/or the like).

Thus, depending on the outcome of step S511, the base station 5 has the following options (denoted options 'A' and 'B' in FIG. 5).

If the base station 5 determines that the newly selected MME 9D is available/operational (option 'A' in FIG. 5), then the base station 5 proceeds to step S512a and forwards (reroutes) the NAS message to the newly selected (dedicated) MME 9D (e.g. by embedding the NAS message in an appropriately formatted S1 message). It will be appreciated that the base station 5 is able to select/identify the correct MME 9D based on the MMEGI (for E-UTRAN) associated with that MME 9D (and/or select/identify the correct SGSN based on the Null-NRI (for UTRAN and GPRS) associated with that SGSN).

However, if the base station 5 determines that the newly selected MME 9D is not available/operational (option 'B' in FIG. 5), then the base station 5 proceeds to step S512b, in which the base station 5 generates (e.g. using its S1AP module 67) and sends and appropriately formatted signaling message rejecting the default MME's 9A rerouting request. In this example, the base station 5 generates and sends a 'Reroute NAS Message Reject' message to the default MME 9D (although it will be appreciated that any other suitable (existing or new) message or parameter may be used for rejecting the MME's request for rerouting/redirecting the NAS message to a dedicated network resource). Advantageously, the serving base station 5 also includes in this message information identifying a reason (or cause) for rejecting the default (currently selected) MME's 9 rerouting request (e.g. a 'reject cause' parameter indicating that the dedicated MME 9D is overloaded and/or the like). For example, the reject cause may include information identifying at least one of: a 'high load', an 'overload', a dedicated resource being 'out of order', a 'network failure', and/or the like. It will be appreciated that the above list of reject causes is not exhaustive, and the base station 5 may reject or avoid rerouting the mobile device 3D to the DCN 7D for any other reason.

Thus, effectively, the base station 5 is able to request the default MME 9A not to reroute the NAS message again and to attempt to serve the mobile device 3D (at least until the dedicated MME 9D remains overloaded/unavailable).

Beneficially, as generally shown in steps S515*a* and S515*b*, the default MME 9A may be configured to: i) accept NAS messages from the mobile device 3D (instead of rerouting it to the dedicated core network) and continue serving the mobile device 3D and handle the NAS message sent in step S501 (even though the default MME 9A has attempted to reroute that particular NAS message); or ii) reject the NAS message from the mobile device 3D (e.g. by generating and sending an appropriate error message to the mobile device 3D). When rejecting the NAS message from the mobile device 3D, the MME can return a Mobility Management back-off timer in the reject message so that the mobile device 3D does not come back until the back-off timer expires.

Operation—Second Embodiment (MME Controlled Rerouting)

Figure 6:
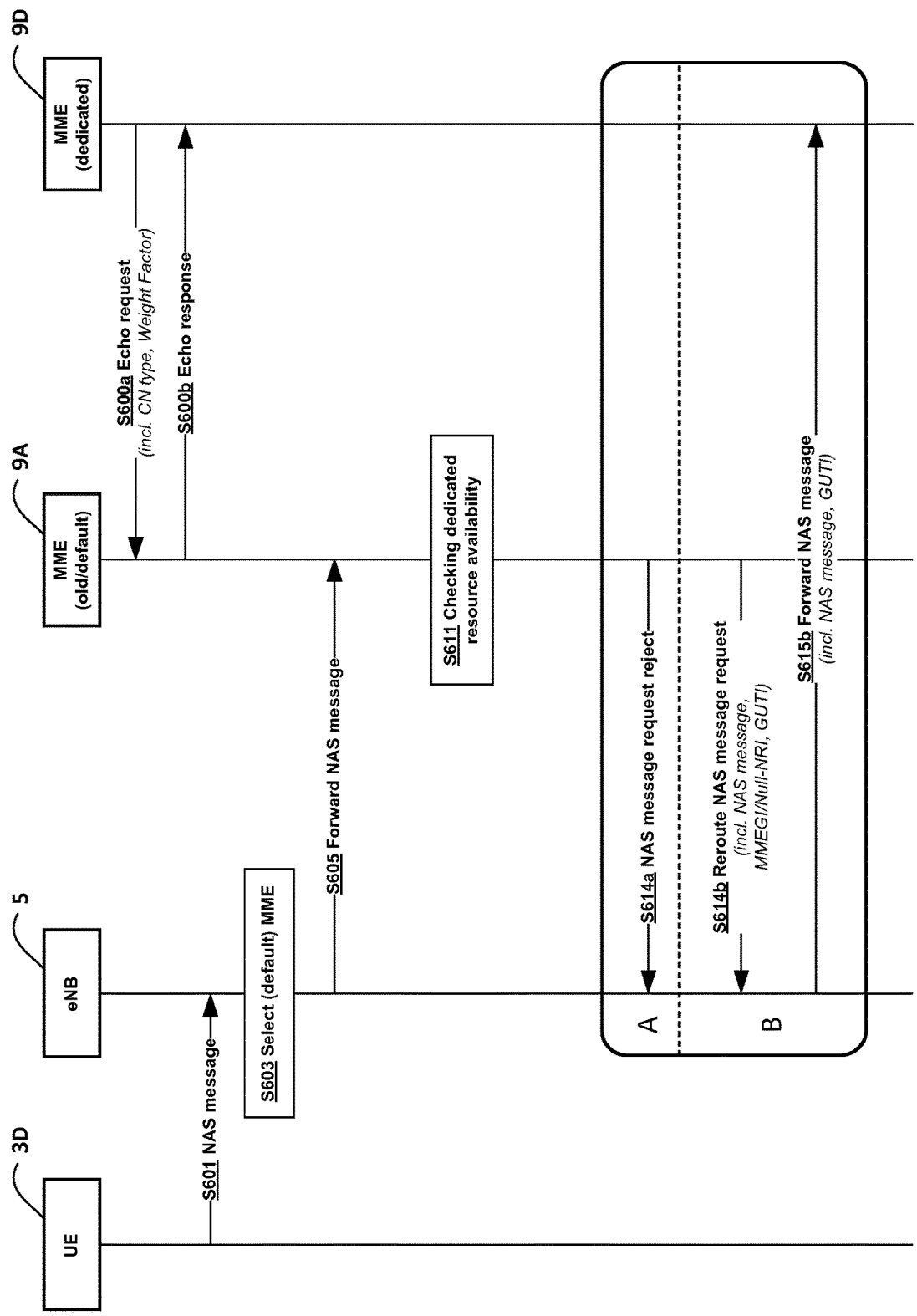

FIG. 6 illustrates an exemplary timing diagram indicating a procedure for rerouting a NAS message. Specifically, in this example, the MME 9 currently allocated to the mobile device 3D determines whether or not the rerouting is possible. In order to do so, the MMEs 9 may be configured to exchange with each other information relating to their respective load levels, availability, and/or the like.

For example, the MMEs 9 may exchange information identifying:
- a core network type (core network type (dedicated or not), core network name, and/or any information suitable for defining the type and purpose of a core network) associated with a particular MME; and/or
- a load level associated with a particular MME (e.g. using a so-called weight factor and/or any other information indicating a load level).

It will be appreciated that such information may be obtained during an initial setup procedure which configures a respective connection between MMEs and/or anytime later when a neighbouring MME is reconfigured (e.g. using suitable 'MME configuration update' signaling, 'MME status update' signaling, and/or any existing or newly defined signaling suitable for exchanging information on associated dedicated network type and load level between MMEs, either directly or indirectly).

In a particularly beneficial case, which is generally illustrated in steps S600*a* and S600*b* of FIG. 6, the default MME 9A and its neighbouring (dedicated) MME 9D may be configured to exchange Echo Request/Response messages (which are described in detail in 3GPP TS 29.060 V12.7.0, section 7.2).

As can be seen, in this case the dedicated MME 9D generates and sends (in step S600*a*) an appropriately formatted Echo Request message to its neighbour MME 9A. The dedicated MME 9D includes in its message information identifying the type of DCN that the MME 9D belongs to (e.g. a 'CN type' parameter), and information identifying a load of the MME 9D (e.g. a 'weight factor' parameter). In response to this, the MME 9A generates and returns (in step S600*b*) an appropriately formatted Echo Response message to the MME 9D confirming receipt of the Echo Request message at step S600*a*. Although not shown in FIG. 6, it will be appreciated that the MME 9A may also provide, to the dedicated MME 9D, information identifying its own DCN type (if any) and information identifying its own load, for example, within the Echo Response message at step S600*b* and/or in a separate Echo Request message.

Steps S601 to S605 correspond to steps S501 to S505 of FIG. 5, respectively, thus their description is omitted here for simplicity.

When a common/default MME 9 receives a NAS message from a mobile device 3, it looks for a neighbour MME/SGSN of the correct dedicated core network type (e.g. the same as the network type of that mobile device 3) and checks the availability/load (weight factor) of such MMEs/SGSNs, based on the information exchanged between the neighbouring MMEs (e.g. in steps S600*a* and S600*b*).

In this example, the mobile device 3D is associated with (and hence it should be served by) the dedicated MME 9D. Accordingly, as generally shown in step S611, before rerouting the NAS message, the default (currently selected) MME 9A (using its DCN module 89) checks the status of that MME 9D.

Specifically, in this example, the MME 9A checks the status of the MME 9D using information identifying at least one of:
- a core network type for the selected MME 9D;
- a weight factor for the selected MME 9D;
- a high load (e.g. over a predetermined threshold) for the selected MME 9D;
- a relative load for the selected MME 9D (compared to another MME 9, e.g. the default MME 9A);
- an overload of the selected MME 9D;
- a network failure;
- the selected MME 9D being out of order (at least temporarily);
- dedicated resources/DCN 7D not supported (e.g. via this base station 5 and/or in the mobile device's 3D current location); and
- none of the above.

Thus, depending on the outcome of step S611, the MME 9A has the following options (denoted options 'A' and 'B' in FIG. 6).

If the currently selected MME 9A determines that the appropriate dedicated MME 9D is not available/operational (and that the currently selected MME 9A cannot serve the mobile device 3D), then the MME 9A proceeds to step S614*a* (option 'A' in FIG. 6), in which the MME 9A generates (e.g. using its NAS module 85) and sends and appropriately formatted signaling message to the mobile device 3D (via the base station 5 using the S1AP module 87) in which the MME 9A rejects the NAS message sent in step S601.

However, if the currently selected MME 9A determines that the appropriate dedicated MME 9D is available/operational (option 'B' in FIG. 6), then the MME 9A proceeds to step S614*b* and requests the serving base station 5 to forward (reroute) the NAS message to the (dedicated) MME 9D (identified by its MMEGI (or Null-NRI in case of an SGSN). Steps S614*b* and S615*b* correspond to steps S509 and S512*b* of FIG. 5, respectively, thus their description is omitted here for simplicity.

Operation—Third Embodiment

Figure 7:
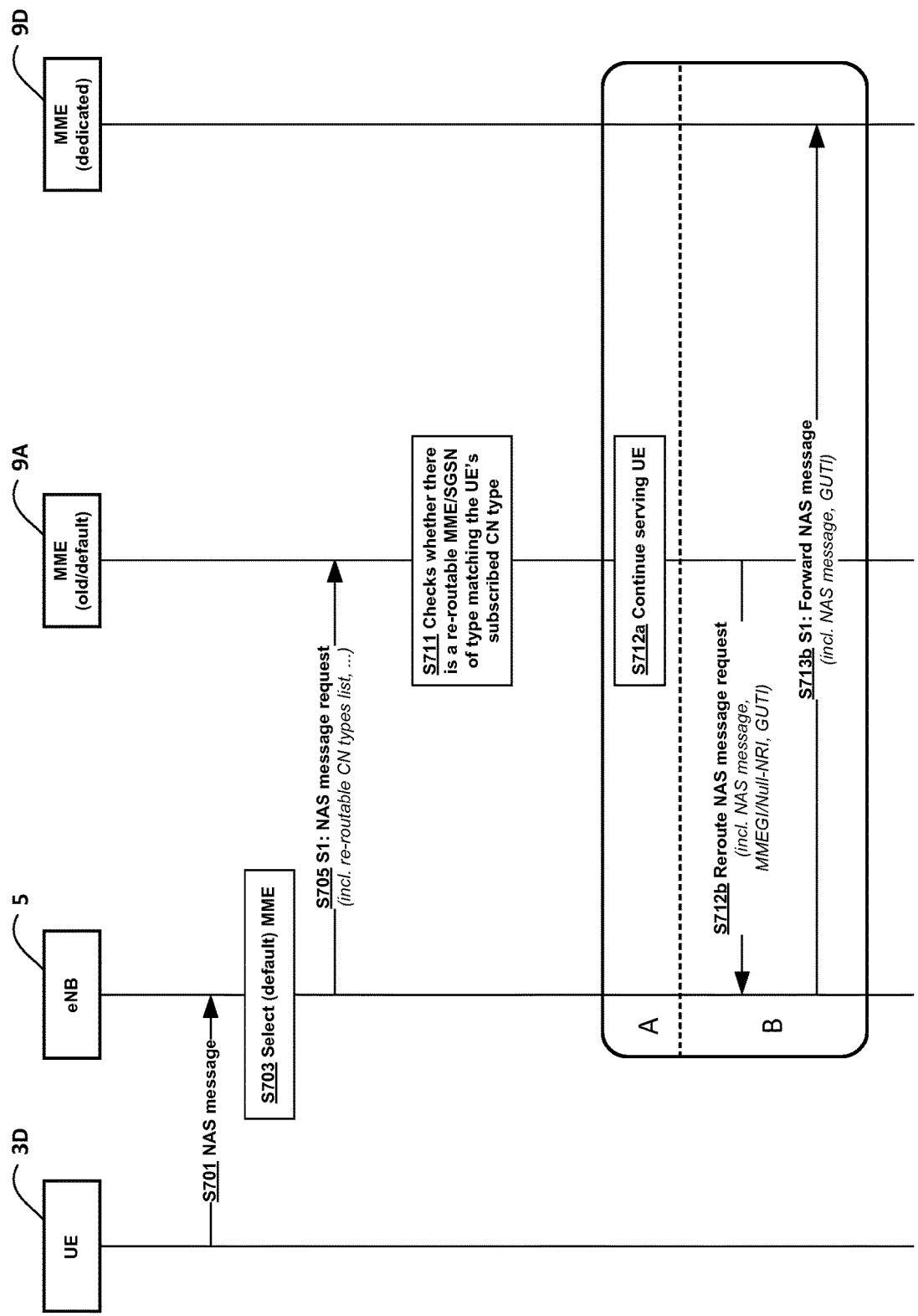

FIG. 7 illustrates another exemplary timing diagram indicating a procedure for rerouting a NAS message. In this example, the base station 5 assists the default MME 9A in determining whether or not rerouting to a DCN is possible.

Steps S701 to S703 correspond to steps S501 to S503 of FIG. 5, respectively, thus their description is omitted here for simplicity.

In step S705, which generally corresponds to step S505, the base station 5 (using its RRC module 64) takes the NAS message from the received RRC message and forwards the NAS message to the selected (default) MME 9A (e.g. by embedding the NAS message in an appropriately formatted S1 message, such as a 'NAS Message Request' and/or the like). However, in this case, the base station 5 also includes in this message information identifying the core network type(s) that can be re-routed (or for which an associated DCN has been deployed). For example, this information may be provided in the form of a list of re-routable CN types, a list of re-routable dedicated resources (MMEs/SGSNs), and/or the like.

It will be appreciated that this information may be included in one or more suitable information element (IE) within the base station's 5 message. The one or more information element may comprise, for example, a 're-routable CN types' IE and/or similar, and may list each dedicated resource connected to the base station 5 that is (currently) re-routable. In determining whether or not a particular dedicated resource (MME/SGSN) is re-routable (and hence to be included in the IE), the base station 5 may be configured to check whether that dedicated resource:

has a load level (weight factor and/or any other load information) below a predetermined threshold (which threshold may be configurable by the operator);
is not overloaded (e.g. no overload indication was received with respect to that dedicated resource or an end of overload indication was received); and/or
is not subject to network failure or any other temporary unavailability.

When a common/default MME 9 receives a NAS message from a mobile device 3, it checks the received IE, in step S711, whether it includes any re-routable MME/SGSN of the type matching the mobile device's 3D core network type.

Thus, depending on the outcome of step S711, the common/default MME 9A has the following options (denoted options 'A' and 'B' in FIG. 7).

If the common/default MME 9A determines that none of the re-routable MMEs/SGSNs indicated in the message in step S705 is associated with the mobile device 3D (no appropriate dedicated MME 9D (or SGSN) of the type matching the mobile device's 3D core network type is available), then the default MME 9A proceeds to step S712a (option 'A' in FIG. 7), and continues serving the mobile device 3D and handles the NAS message sent in step S701 (even though the default MME 9A is not associated with the core network type associated with that mobile device 3D).

However, if the default MME 9A determines that (at least) one of the re-routable MMEs/SGSNs indicated in the message in step S705 is associated with the mobile device 3D (an appropriate dedicated MME 9D (or SGSN) of the type matching the mobile device's 3D core network type is available), then the default MME 9A selects an appropriate dedicated resource (in this case the dedicated MME 9D) and proceeds to step S712b (option 'B' in FIG. 7). Steps S712b and S713b correspond to steps S509 and S512b of FIG. 5, respectively, thus their description is omitted here for simplicity.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the mobile devices are cellular telephones. It will be appreciated that the above embodiments could be implemented using devices other than mobile telephones such as, for example, personal digital assistants, laptop computers, web browsers, etc. The above embodiments are applicable to non-mobile or generally stationary user equipment as well.

In the above description of the embodiments, the exemplary network nodes are base stations and MMEs. However, it will be appreciated that a radio network controller (RNC) may be used instead of the (LTE) base station and an SGSN may be used instead of the MME.

The above embodiments have been described using an MME for illustrative purposes only and in no way shall be considered limiting the invention to require an MME and/or a LTE core network. For example, an SGSN may be used instead of an MME. In this case, an appropriate SGSN group identifier (or a Null-NRI) may be used instead of the MMEGI described in steps S509/S614b/S712b above. It will also be appreciated that an RNC may be used instead of the base station. Embodiments of the invention are applicable to systems according to other (3GPP and/or non-3GPP) standards as well in which user equipment is required to connect to dedicated network nodes.

In the above description of the embodiments, the serving base station rejects the MME's rerouting request (and/or the MME rejects the NAS message) in case of an overload/unavailability of a dedicated MME. However, it will be appreciated that in this case the base station (or the MME) may also be configured to select a different MME (e.g. a common MME) instead of the overload/unavailable dedicated MME, depending on operator configuration. Such selection configuration may be applied per user/UE/MMEGI/MME etc.

It will be appreciated that if the old (default) MME continues to serve the mobile device due to a dedicated MME/SGSN being unavailable (e.g. as shown in step S515 of FIG. 5 and step S712b of FIG. 7), the old MME may subsequently attempt to reroute the mobile terminal (and/or any associated NAS messages) to a dedicated MME/SGSN, for example, when a predetermined time has passed after registering the mobile device with the default MME (e.g. based on a pre-configured timer) and/or upon receipt of a subsequent NAS message from that mobile device (e.g. from the same and/or from a different tracking area).

It will also be appreciated that when a dedicated MME/SGSN is unavailable (e.g. option 'B' of FIG. 5 and option 'A' of FIG. 7), the currently selected MME may be configured to reject the mobile device's NAS message, e.g. by performing step S614a instead of step S515 or S712a). It will be appreciated that when rejecting the NAS message from the mobile device, the MME may return a so-called Mobility Management back-off timer in its rejection message to the mobile device so that the mobile device does not attempt to come back (re-send the NAS message to the MME) until the back-off timer expires.

It will be appreciated that the old (default) and the new (dedicated) MME/SGSN may be physically separated (e.g. provided at different locations) or they may be co-located at the same location (although provided as logically separate entities).

It will be appreciated that the selected DCN (or dedicated core network node, MME/SGSN) may not able to serve the rerouted/redirected mobile device (and hence a reroute/ redirection request may be rejected or not triggered for such DCN) in one or more of the following scenarios:

1) Highly Loaded Dedicated Network Resource

In this case, each MME and/or SGSN may be configured to regularly indicate to the connected base stations (and/or RNCs) a level of a current load associated with that MME/SGSN—for example, using an appropriate 'MME Configuration Update' message (which is described in detail in 3GPP TS 36.413 V12.4.0, section 8.7.5) and/or an appropriate 'S1 Setup Response' message (which is described in detail in 3GPP TS 36.413, section 9.1.8.5). It will be appreciated that the level of a current load may be given as a so-called 'weight factor' (i.e. how busy/loaded the MME/SGSN is, measured in terms of a percentage of a fully loaded state of the MME/SGSN). In this case, the serving base station (or RNC) may be configured to consider the associated weight factors (if available) of each connected MME/SGSN when selecting an appropriate MME/SGSN for the mobile device. In other words, the serving base station (or RNC) may be configured to perform load balancing during the rerouting of a particular NAS message to an appropriate MME/SGSN. If the MME/SGSN load level (indicated with the weight factors) is higher than a certain threshold (which may be set and configured by the network operator), then the serving base station (or RNC) may be configured to avoid or reject rerouting NAS messages to such highly loaded dedicated resources (although rerouting to other, e.g. less loaded, dedicated resources may still be allowed).

2) Overloaded Dedicated Network Resource

Each MME and/or SGSN may be configured to indicate to the connected base stations (and/or RNCs) when the MME/SGSN is in an overloaded state (and consequently that particular MME/SGSN is unable to accommodate or serve any more mobile devices). An indication of an overload state may be provided, for example, using an appropriate 'Overload Start' message (which is described in detail in 3GPP TS 23.401 V12.7.0, section 4.3.7.4). In this case, the serving base station (and/or RNC) may be configured not to select that particular MME/SGSN until the MME/SGSN is in an overload state (e.g. at least until receipt of an appropriate 'Overload Stop' message and/or the like). Thus, similarly to the high load scenario described above, rerouting of NAS messages to overloaded dedicated resource may be rejected or avoided (whilst rerouting to other dedicated resources may still be allowed).

3) Temporary Out of Order Dedicated Network Resource

It will be appreciated that the serving base station (or RNC) may be able to obtain information indicating when a dedicated MME/SGSN is temporarily out of order (e.g. by receiving an appropriate error indication and/or configuration indication and/or by determining that communication with a particular dedicated MME/SGSN has failed, e.g. due to time-out and/or the like). Thus, similarly to the high load and overload scenarios described above, the serving base station (or RNC) may be configured to reject or avoid rerouting of NAS messages to such an out of order resource.

4) Not Available Dedicated Network Resource

It will also be appreciated that the serving base station (or RNC) may be able to determine that a dedicated MME/SGSN is not available for any other reason (e.g. a network/communication failure; the mobile device is located in an area where dedicated resources are not deployed; no dedicated resources are associated with a particular type of mobile device/service; and/or the like). Thus, similarly to the other three scenarios, the serving base station (or RNC) may be configured to reject or avoid rerouting of NAS messages to unavailable dedicated resources.

In the above description of steps S512b and S515, the currently selected MME is described to continue serving the mobile device upon receipt of a message from the serving base station rejecting the requested NAS redirection. However, it will also be appreciated that, for example, based on operator preferences (such as dedicated and non-dedicated networks interworking policy configurations and/or the like), upon receiving the 'Reroute NAS Message Reject' message in step S512b with one of the above listed reject cause values, the current (default) MME may also be configured to decide whether to:

a) accept the NAS message from the mobile device (e.g. an initial 'Attach Request', a 'TAU Request', and/or a 'RAU Request') and continue serving the mobile terminal (e.g. as described above with reference to step S515 of FIG. 5);

b) accept the NAS message from the mobile device temporarily, and attempt to reroute the mobile device to the dedicated MME/SGSN after some time (e.g. based on a pre-configured timer); or c) reject the NAS message from the mobile device (e.g. by returning an appropriate response as described above with reference to step S614a of FIG. 6).

It will also be appreciated that, in either embodiment, if the currently selected (default) MME decides to reject serving the mobile device (e.g. by sending a 'Reject the NAS Message Request'), the default MME may include in its message one or both of:

a parameter indicating an associated Mobility Management back-off timer value described in 3GPP TS 23.401 V12.7.0, section 4.3.7.4.2; and a parameter indicating an associated Evolved Packet System (EPS) Mobility Management (EMM) cause described in 3GPP TS 24.301 V12.7.0, section 9.9.3.9 (e.g. 'Tracking Area not allowed', 'Congestion', 'Network Failure', etc.).

In the above description of FIG. 6, steps S600a-S600b and step S611 are described to be separate procedures. However, it will be appreciated that the default MME may be configured to obtain the CN type and weight factor for the dedicated MME as part of step S611 (e.g. by sending an appropriate Echo Request (and/or the like) and receiving a corresponding Echo Response with the dedicated MME's associated CN type and weight factor).

In the above description of step S705, the base station is described to include a list of re-routable dedicated resources. However, it will be appreciated that the base station may also be configured to include in this message a list of non-re-routable dedicated resources (in addition to, or instead of the list of re-routable dedicated resources), for example, a list of MMEs/SGSNs that are currently unavailable. In this case, the default MME may be configured to select (in step S711) a target MME by also taking into account the list of non-re-routable dedicated resources.

It will be appreciated that the base station and/or MME may be configured to count the number or rate of reroute procedures (e.g. number of NAS messages rerouted per sec/min/etc.) in order to avoid overloading a particular dedicated MME. In other words, the rerouting rate may be controlled, and if a predetermined number has been exceeded, then the base station and/or MME may be configured to check the status of the target MME before attempting to reroute any further NAS message to that MME.

It will be appreciated that the above embodiments may also be applied to heterogeneous/partial DCN deployments, when a DCN is deployed only for some RATs (but not all) and/or only for a specific area (tracking/routing area) within the network. In this case, the base station and the MME may be configured to take into account whether the mobile device is inside or outside the specific service area and/or RAT that supports the DCN functionality (for that mobile device).

It will be appreciated that the above described NAS message redirection (and/or MME/SGSN re-selection) might also be carried out for load balancing purposes (e.g. for moving subscribers from an MME/SGSN having an overload or an MME/SGSN having a relatively high load to another MME(s)/SGSN(s) having a relatively low load).

In the above embodiments, a number of software modules were described. As those skilled in the art will appreciate, the software modules may be provided in compiled or un-compiled form and may be supplied to the base station or the MME as a signal over a computer network, or on a recording medium. Further, the functionality performed by part or all of this software may be performed using one or more dedicated hardware circuits. However, the use of software modules is preferred as it facilitates the updating of the base station, the MME, and the mobile device in order to update their functionalities.

The message including information identifying a group of at least one core network node may comprise information identifying at least one dedicated mobility management entity (MME) and/or at least one dedicated SGSN of a type corresponding to that of the communication device that sent said signaling for establishing a communication connection.

The signaling for establishing a communication connection may comprise a non-access stratum (NAS) message (e.g. an attach request message, a tracking area update message, or a location area update message)

The plurality of core network nodes may comprise a plurality of mobility management entities (MMEs) and/or serving GPRS support nodes (SGSNs). In this case, the first core network node may comprise a default MME or a default SGSN.

The communication apparatus may comprise at least one of: a base station and a radio network controller (RNC).

The determining means of said communication apparatus may be operable to determine whether at least one core network node of said group is available based on information identifying at least one of: a core network type for said group; a weight factor for a core network node of said group; a status of a core network node of said group; a high load (e.g. a load over a predetermined threshold) for a core network node of said group; a relative load for a core network node of said group (e.g. compared to another core network node); an overload of a core network node of said group; a network failure; a core network node of said group being out of order (at least temporarily); and that dedicated core network resources and/or dedicated core networks are not supported.

When rerouting said signaling for setting up said communication connection to a default core network node that does not form part of said group, the rerouting means of the communication apparatus may be operable to include information identifying a reason for rerouting said NAS message to said core network node (e.g. a 'reject cause'). The rerouting means of the communication apparatus may be operable to select said default core network node (e.g. using a NAS node selection function) based on at least one of: an MME group identifier (MMEGI), a network resource identifier (e.g. 'Null-NRI'), a serving GPRS support node (SGSN) group identifier, and a globally unique temporary identifier (GUTI). The default core network node may comprise the first core network node.

When rerouting said signaling for setting up said communication connection to said default core network node, the rerouting means of the communication apparatus may be operable to send, to said default core network node, at least one of: a 'reroute NAS message reject' message, a 'forward NAS message' message, and an 'initial UE message'. The message including information identifying a group of at least one core network node may comprise a Reroute NAS message request.

The core network may be configured to set up said communication connection between said core network node and said communication device upon said receiving means receiving said message rerouting said signaling to said core network node. The core network node may be configured to reject said signaling for setting up said communication connection between said core network node and said communication device upon said receiving means receiving said message rerouting said signaling to said core network node. In this case, the core network node may be further configured to provide, to said communication device, information identifying at least one of: i) a back-off timer value; and ii) a cause for rejecting said signaling for setting up said communication connection between said core network node and said communication device (e.g. tracking area not allowed, congestion, network failure).

The core network node may comprise a mobility management entity (MME) or a serving GPRS support node (SGSN).

Various other modifications will be apparent to those skilled in the art and will not be described in further detail here.

The invention claimed is:

1. A communication method of a communication apparatus in a wireless communication system, the communication method comprising:
   receiving, from a communication device, a first message for establishing a communication connection with the communication device;
   sending the first message to a first core network node;
   receiving, from the first core network node, a second message including information identifying a group of at least one core network node;
   selecting the first core network node or a core network node within a default dedicated core network as a second core network node in a case where no valid core network node is available within the group;
   sending a third message including the first message to the second core network node, wherein the third message indicates that the first message shall not be rerouted; and
   receiving information identifying:
      a cause for rejecting the first message from the second core network node, and
      back-off time.

2. The communication method according to claim 1, wherein the group comprises a dedicated core network of at least one Mobility Management Entity (MME) and/or at least one Serving General packet radio service Support Node (SGSN), the dedicated core network corresponding to a type of the communication device that sends the first message.

3. The communication method according to claim 1, further comprising:
selecting a core network node from a set of at least one valid core network node in a case where at least one valid core network node of the group is available.

4. The communication method according to claim 3, further comprising:
determining whether the at least one valid core network node of the group is available based on information identifying at least one of:
a core network type for the group;
a weight factor for a core network node of the group;
a status of a core network node of the group;
a load for a core network node of the group;
a relative load for a core network node of the group;
an overload of a core network node of the group;
a network failure;
a core network node of the group being out of order; and
that at least one of dedicated core network resources and dedicated core networks is not supported.

5. The communication method according to claim 1, further comprising:
selecting the second core network node based on at least one of:
i) a mobility management entity group identifier (MMEGI),
ii) a network resource identifier,
iii) a Serving General packet radio service Support Node (SGSN) group identifier, and
iv) a globally unique temporary identifier (GUTI).

6. The communication method according to claim 1, wherein the third message is an Initial UE message.

7. A communication method of a core network node in a wireless communication system, the communication method comprising:
receiving a first message for establishing a communication connection for a communication device from a communication apparatus of the wireless communication system;
sending, after receiving the first message, to the communication apparatus, a second message including information identifying a group of at least one core network node;
receiving, in a case where no valid core network node is available within the group of at least one core network node, a third message including the first message from the communication apparatus; and
providing the communication apparatus with information identifying:
a back-off timer value, and
a cause for rejecting the third message,
wherein the third message indicates that the first message shall not be rerouted.

8. The communication method according to claim 7, further comprising completing a Non-Access Stratum (NAS) procedure upon receiving the third message.

9. The communication method according to claim 7, further comprising rejecting the third message.

10. A communication method for a communication device configured to communicate with a communication apparatus, comprising:
sending, to the communication apparatus, a first message for establishing a communication connection to cause the communication apparatus to send the first message to a first core network node, wherein a third message including the first message is sent to the first core network node or a core network node within a default dedicated core network as a second core network node in a case where no valid core network node is available within a group of at least one core network node, the group being identified by information sent from the first core network node,
the third message indicates that the first message shall not be rerouted, and
the communication apparatus receives information identifying:
a cause for rejecting the first message from the second core network node, and
back-off time.

11. A communication apparatus in a wireless communication system, the communication apparatus comprising:
a transceiver configured to:
communicate with at least one communication device, and
receive, from a communication device, a first message for establishing a communication connection;
a transmitter configured to send the first message to a first core network node;
a receiver configured to receive from the first core network node, a second message including information identifying a group of at least one core network node; and
at least one processor configured to process to select the first core network node or a core network node within a default dedicated core network as a second core network node in a case where no valid core network node is available within the group, wherein
the transmitter is further configured to send a third message including the first message to the second core network node,
the third message indicates that the first message shall not be rerouted, and
the transmitter is further configured to receive information identifying:
a cause for rejecting the first message from the second core network node, and
back-off time.

12. A core network node in a wireless communication system, comprising:
at least one processor configured to process to
receive a first message for establishing a communication connection for a communication device from a communication apparatus of the wireless communication system,
send, after receiving the first message, to the communication apparatus, a second message including information identifying a group of at least one core network node,
receive, in a case where no valid core network node is available within the group of at least one core network node, a third message including the first message, from the communication apparatus, and
provide the communication apparatus with information identifying:
a back-off timer value, and
a cause for rejecting the third message,
wherein the third message indicates that the first message shall not be rerouted.

13. A system comprising:
a communication apparatus, and a first core network node, wherein
the communication apparatus includes:

a transceiver configured to:
  communicate with at least one communication device, and
  receive, from a communication device, a first message for establishing a communication connection;
a transmitter configured to send the first message to the first core network node;
a receiver configured to receive from the first core network node, a second message including information identifying a group of at least one core network node; and
at least one processor configured to process to select the first core network node as a second core network node in a case where no valid core network node is available within the group, wherein
the transmitter is further configured to send a third message including the first message to the second core network node,
the third message indicates that the first message shall not be rerouted, and
the transmitter is further configured to receive information identifying:
  a cause for rejecting the first message from the second core network node, and
  back-off time; and
the first core network node includes:
  at least one processor configured to process to:
  receive the first message from the communication apparatus,
  send, after receiving the first message, to the communication apparatus, the second message including information identifying the group of at least one core network node,
  receive, in a case where no valid core network node is available within the group of at least one core network node, the third message including the first message, from the communication apparatus, and
  provide the communication apparatus with information identifying:
    a back-off timer value, and
    a cause for rejecting the third message.

14. A communication device, comprising:
at least one processor configured to process to:
communicate with a communication apparatus, and
send, to the communication apparatus, a first message for establishing a communication connection to cause the communication apparatus to send the first message to a first core network node,
wherein
  a third message including the first message is sent to the first core network node or a core network node within a default dedicated core network as a second core network node in a case where no valid core network node is available within a group of at least one core network node,
  the group is identified by information sent from the first core network node,
  the third message indicates that the first message shall not be rerouted, and
  the communication apparatus receives information identifying:
    a cause for rejecting the first message from the second core network node, and
    a back-off time.

* * * * *